United States Patent
Booman et al.

(10) Patent No.: US 7,962,599 B2
(45) Date of Patent: Jun. 14, 2011

(54) METHODS AND APPARATUS FOR INFORMATION PROCESSING AND DISPLAY FOR NETWORK MANAGEMENT

(75) Inventors: Gordon Andrew Booman, Berlin, MA (US); John Oliver Boutotte, Sterling, MA (US); Robert Alan Lindberg, Stow, MA (US); Florent Mali, Framingham, MA (US); Patricia Anne Mulligan, Boylston, MA (US); Jaimin D. Patel, Sudbury, MA (US); Mark W. Sylor, Nashua, NH (US)

(73) Assignee: Computer Associates Think, Inc., Islandia, NY (US)

( * ) Notice: Subject to any disclaimer, the term of this patent is extended or adjusted under 35 U.S.C. 154(b) by 106 days.

(21) Appl. No.: 12/430,370

(22) Filed: Apr. 27, 2009

(65) Prior Publication Data
US 2010/0177640 A1    Jul. 15, 2010

Related U.S. Application Data

(62) Division of application No. 11/037,390, filed on Jan. 16, 2005, now Pat. No. 7,526,542.

(60) Provisional application No. 60/537,111, filed on Jan. 16, 2004.

(51) Int. Cl.
*G06F 15/16*    (2006.01)
*G06F 12/00*    (2006.01)

(52) U.S. Cl. ........................... 709/223; 709/250

(58) Field of Classification Search ................. 709/224, 709/217–218, 250, 223; 714/4
See application file for complete search history.

(56) References Cited

U.S. PATENT DOCUMENTS

| | | | |
|---|---|---|---|
| 5,333,272 A * | 7/1994 | Capek et al. .................. 715/727 |
| 5,537,532 A * | 7/1996 | Chng et al. ........................ 714/4 |
| 5,563,875 A * | 10/1996 | Hefel et al. .................. 370/249 |
| 5,668,800 A * | 9/1997 | Stevenson ..................... 370/248 |
| 5,761,429 A | 6/1998 | Thompson ............... 395/200.54 |
| 5,903,894 A | 5/1999 | Reneris ......................... 707/100 |
| 6,742,003 B2 | 5/2004 | Heckerman et al. ....... 707/104.1 |
| 6,742,042 B1 | 5/2004 | Holden et al. ............... 709/230 |
| 7,072,800 B1 | 7/2006 | Fernandez et al. ............ 702/186 |
| 7,088,255 B2 | 8/2006 | Ridolfo et al. ............... 340/635 |
| 2002/0186238 A1 | 12/2002 | Sylor et al. .................... 345/736 |
| 2005/0099955 A1* | 5/2005 | Mohan et al. ................. 370/242 |
| 2006/0029085 A1 | 2/2006 | Booman et al. .............. 370/401 |
| 2006/0173992 A1 | 8/2006 | Weber et al. .................. 709/224 |

FOREIGN PATENT DOCUMENTS
WO    WO 2005/072160    8/2005
* cited by examiner

*Primary Examiner* — Zarni Maung
(74) *Attorney, Agent, or Firm* — Pillsbury Winthrop Shaw Pittman LLP

(57) ABSTRACT

Apparatus and methods for automatically processing and displaying information for managing equipment or services in a network. The information is automatically inserted into a hierarchical data structure, which can then be presented in a ticker display for viewing by a user. The information concerning the network equipment or services may also be used to determine the users affected by particular network failures.

21 Claims, 8 Drawing Sheets

METHODS AND APPARATUS FOR INFORMATION PROCESSING AND DISPLAY FOR NETWORK MANAGEMENT

CROSS-REFERENCE TO RELATED APPLICATIONS

This application is a divisional of U.S. patent application Ser. No. 11/037,390, filed Jan. 16, 2005 now U.S. Pat. No. 7,526,542, which claims priority to U.S. Provisional Patent Application Ser. No. 60/537,111, filed Jan. 16, 2004 entitled Business Services Console Method and System, which is incorporated by reference herein.

FIELD OF THE INVENTION

The present invention relates generally to information processing and display, and, more particularly, to the automated processing and display of information for network management.

BACKGROUND OF THE INVENTION

Computer networks have become increasingly useful as network speed and reliability have increased. Generally, a computer network consists of network equipment (including computers, routers, switches, and servers), the media that connects the equipment (like cable, fiber, or a radio frequency signal), and the application programs or services provided by the network equipment. Data that is stored on any particular piece of network equipment may be accessible to any other piece of network equipment connected to the storing network equipment. In this way, computer networks may allow users and applications to interact over large or small geographical distances by sharing information.

Equipment failures within computer networks result in lost time, lost opportunities to conduct business, and create general frustration among users of the network. Failed network equipment particularly affects the users of that equipment. In networks with a relatively small number of pieces of network equipment, a network user or network administrator may be able to physically locate failed equipment in order to repair it in a short amount of time once a network problem is identified. However, this approach requires identification of the particular equipment causing the network problem, which can lead to delays in addressing equipment failure. Moreover, as networks employ increasing quantities of interoperating network equipment, locating the particular network equipment causing a problem in the network becomes unwieldy and time-consuming, especially when using tools such as manually-created tables or lists, which can lead to further reductions in productivity. Even if the failed equipment is successfully located, the identification of the failed equipment alone may not provide information about the number or identity of network users who may be affected by the failed equipment.

Hence, there is a need for methods and apparatus to organize and present large amounts of substantially real-time operating information about network equipment in a user-friendly and flexible way that is responsive to a user's requests. There is also a need to organize and present information identifying those network users or equipment affected by the failure of various pieces of network equipment.

SUMMARY OF THE INVENTION

The present invention is directed to apparatus and methods for automatically processing and displaying information for managing equipment in a network. The information is automatically inserted into a hierarchical data structure, which can then presented in a hierarchical display or in a ticker display for viewing by a user. The information concerning the network equipment may also be used to determine the users affected by particular network failures.

In one aspect, the present invention provides a method for processing information. A partially-defined hierarchical data structure is received and a set of elements from an information source is retrieved. The retrieved element has descriptive data associated with it, and the descriptive data associated with the retrieved element is used, at least in part, to automatically add the set of elements into at least one level of the hierarchical data structure. The retrieval and addition of elements may continue until all of the elements in the source of information are retrieved and added to the partially-defined hierarchical data structure. The partially-defined hierarchical data structure may be used to describe a network of equipment and application services, and the elements can describe particular items of equipment or applications or services in the network. Elements within the information source may be organized in a substantially flat arrangement.

The addition of the set of elements to the partially-defined hierarchical data structure may be accomplished by modifying the partially-defined hierarchical data structure itself or, alternately, may be achieved by forming a new data structure based at least in part on the partially-defined hierarchical data structure and adding the set of elements into at least one level of the new data structure based at least in part on the descriptive data associated with the set of elements. The new data structure may be augmented by the set of elements based on the descriptive data.

In one embodiment, the method also includes responding to a request for information from a user or an automated system. The method may also include the display of at least a portion of the hierarchical data structure having the at least one automatically-added element. In such an embodiment, the method may include displaying an alarm state positioned adjacent to the at least one automatically-added element that triggered the alarm. In another embodiment; the method includes displaying an alarm state for the at least one automatically-added element at a higher level in the hierarchy.

In one embodiment, automatically adding the set of elements includes identifying, through descriptive data associated with the element, at least one of the source for a communication associated with the set of elements, the destination for a communication associated with the set of elements, the application type associated with the set of elements, the type of the element of the set of elements, or relationship data for the set of elements. The element is added to the hierarchical data structure in a category defined by the identified parameter.

In one embodiment, the number of users affected by an alarm condition that affects an element in the hierarchical data structure is displayed. In another embodiment, a cost estimate related to an alarm condition that affects an element in the hierarchical data structure is displayed. In still another embodiment, a temporal display of alarm states provides a chronological illustration of network conditions.

In another embodiment, at least a portion of the hierarchical data structure is displayed in a ticker display. The ticker display may occupy a space that is less than the entire graphical display. A filter may be applied to control the portion of the alarm state or states that are displayed. In one embodiment, a portion of the hierarchical data structure is displayed in response to a command received from a user.

According to an embodiment of the invention, elements may be associated with descriptive data. In one embodiment, descriptive data may include, for example, relationship data, property data, or attribute data. Relationship data may include, for example, device containment, device links, service links, or application dependencies. Typical forms of attribute data include technology type and application type. Exemplary attribute data include names or aliases for a piece of network equipment. In one embodiment, the method includes automatically adding elements to the hierarchical data structure based at least in part on similarities in their associated descriptive data. In another embodiment, the method taught by the present invention includes at least three hierarchical levels and may include sub-hierarchies within each hierarchical level.

In yet another aspect, the invention provides a system for processing information that includes a partially-defined hierarchical data structure, a source of information including a set of elements associated with descriptive data, and a processing engine. The processing engine automatically adds the set of elements to at least one level of the hierarchical data structure, based at least in part on the descriptive data associated with the element. The partially-defined hierarchical data structure may be used to describe a network of equipment and application services, and the elements can describe particular items of equipment or applications or services in the network.

In one embodiment, the system also includes an input capable of receiving a request for information from a user or an automated system. In another embodiment, the system also includes a graphical display for displaying a portion of the hierarchical data structure that contains the at least one automatically added element. In such an embodiment, the graphical display shows an alarm state adjacent to the display of the at least one automatically added element upon the triggering of an alarm condition. In another embodiment, the alarm state may be displayed at a higher level in the hierarchical data structure than the automatically-added element.

In one embodiment, the processing engine includes an identifier and a categorizer. In one embodiment, the identifier, through the descriptive data associated with the set of elements, identifies at least one parameter selected from the group consisting of the source for a communication associated with the set of elements, the destination for a communication associated with the set of elements, the application type associated with the set of elements, the type of the element of the set of elements, and relationship data for the set of elements. In such an embodiment, the categorizer automatically adds the set of elements to the hierarchical data structure in a category defined by the identified parameter In one embodiment, the system includes a graphical display for displaying the number of users affected by an alarm condition that affects an element in the hierarchical data structure. In another embodiment, the system includes a graphical display for displaying a cost estimate relating to an alarm condition affecting an element in the hierarchical data structure. In still another embodiment, the system includes a graphical display of a temporal display of alarm states.

In still another embodiment, the graphical display may display a portion of the hierarchical data structure in a ticker display. In such an embodiment, the ticker display may occupy less space than the entire graphical display. In one embodiment, the system includes a filter to control the displayed alarm state. The graphical display may display a portion of the hierarchical data structure in response to a command received from a user.

In another embodiment, the elements of the source of information are organized in a substantially flat arrangement. In yet another embodiment, the descriptive data may include relationship data, property data, or attribute data. Relationship data may include, for example, device containment, device links, service links or application dependencies. Attribute data may include technology type or application type. Exemplary property data includes a name or alias for network equipment, application programs, or application services. In one embodiment, the hierarchical data structure includes at least three levels.

In another aspect, the invention provides a method for determining the number of network users affected by a network problem. A definition of a response set of at least one response element is received, and at least one response element associated with the at least one response element of the response set is identified. At least one response element in the response set affected by an alarm state is identified, and the response elements associated with the at least one response element affected by the alarm state are also identified.

A response element may be a response path, a response source, or a response destination. In one embodiment, the response elements of the response set share the same application type. In another embodiment, the at least one response element of the response set is a response source, and the at least one associated response element is the response source and the associated response path. In still another embodiment, the at least one response element of the response set is a response path, and the at least one associated response element is a response source. In yet another embodiment, the at least one response element of the response set is a response destination, and the at least one associated response element is a response source associated with a response path associated with the response destination of the response set. In still another embodiment, the at least one response element of the response set is a client set, and the at least one associated response element is the members of the client set.

In one embodiment, the response elements associated with the at least one response element affected by the alarm set are unique. In a further embodiment, the total number of unique response sources in the set of response elements associated with the response elements of the response set is determined.

In still another aspect, the invention provides a method for displaying an hierarchical data structure. At least one level of elements from the hierarchical data structure is selected, and the selected level of elements is displayed in a ticker display, which may occupy a space that is less than the entire graphical display. In one embodiment, a user selects a displayed element, and detailed information about the selected element is displayed. In another embodiment, a user is prompted to select the at least one level of elements from the hierarchical data structure to be displayed. The hierarchical data structure may include a set of elements added to the structure from a source of information, the addition based at least in part upon descriptive data associated with the set of elements.

The foregoing and other features and advantages of the present invention will be made more apparent from the description, drawings, and claims that follow.

BRIEF DESCRIPTION OF DRAWINGS

The advantages of the invention may be better understood by referring to the following drawings taken in conjunction with the accompanying description in which.

In the drawings, like reference characters generally refer to corresponding parts throughout the different views. The drawings are not necessarily to scale, with emphasis instead being placed on the principles and concepts of the invention.

DETAILED DESCRIPTION OF THE INVENTION

In brief overview, the present invention relates to apparatus and methods for automatically processing and displaying large amounts of information in a hierarchical structure that facilitates easy interpretation of the information. By using a hierarchical structure the system can group and organize the information in various ways, depending upon the requirements of the particular person interpreting the data. Also, the hierarchical structure, enables the system to collapse large amounts of information into more manageable components.

Although these general concepts may be applied to many types of information, and in diverse fields, the descriptions herein are directed to information associated with network management. The scale of current network infrastructures and the large number of elements contained therein can make their management difficult. There may be thousands, tens of thousands, or more managed entities within a network infrastructure. Simple lists and tables cannot present the current status of this number of entities with any reasonable clarity. Embodiments of the present invention described embodiment apply structure to the data, presenting it in a hierarchy, and provides simple point and click mechanisms to allow a user to control the level and scope of detail presented.

Figure 1A:
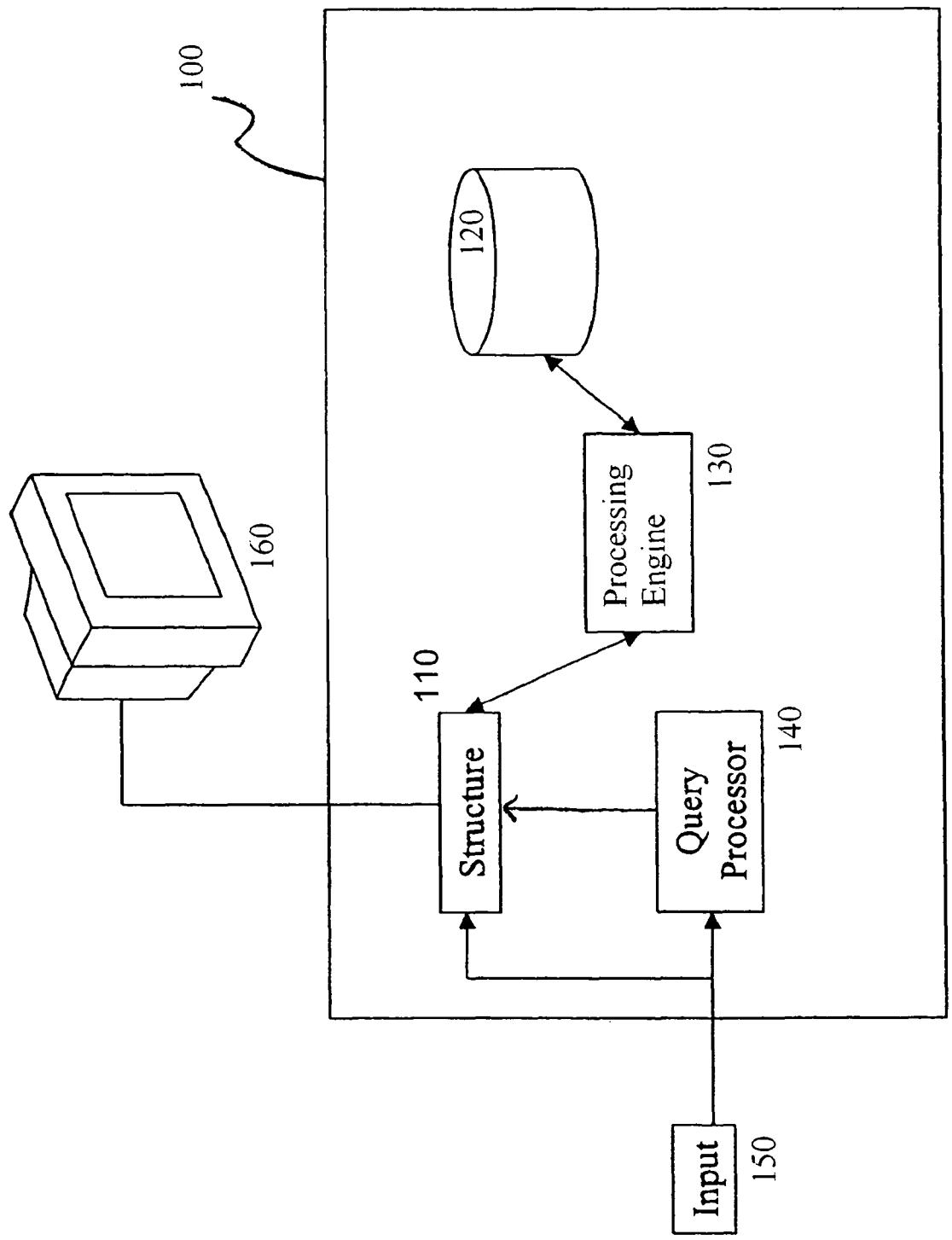
FIG. 1A depicts a system for information processing according to an embodiment of the invention.

Referring to FIG. 1A, a system 100 for information processing according to an embodiment of the invention includes a partially-defined hierarchical data structure 110, an information source 120, and a processing engine 130. The system 100 optionally includes an input 140 in communication with a query processor 150. In a typical embodiment of the invention, the system 100 includes a display 160.

An information source 120 may be situated in a computer network, stored on network equipment such as computers, servers, routers, switches, and accessible through network communication mechanisms such as remote procedure calls (RPC). Alternately, an information source 120 may be a database or a software application co-located with the other software components of the system 100. The information source 120 typically monitors and stores transactions that occur between network sources and network destinations as descriptive data associated with elements in the information source 120.

An information source 120 is usually composed of discrete elements, and generally, those elements are associated with descriptive data. An information source 120 may be identified by at least one of its elements by, for example, referring to the descriptive data associated with that element. Additionally, descriptive data also may define the type of equipment housing the information source 120. As discussed herein, elements may be grouped into "sets." A set of elements may include a single element or, alternately, more than one element.

Descriptive data may include relationship data, property data or attribute data about the element or the information source 120 associated with it. Relationship data relates to information about various pieces of equipment existing in a network environment. For example, relationship data may include device containment information. Device containment relates to the relationship an interface card or central processing unit (CPU) has to a router or other piece of network equipment. For example, a router may contain device containment data and therefore constitute an information source 120 according to the invention.

Relationship data may also describe device links between pieces of network equipment, such as a connection between an interface in a first router to an interface in a second router. Device links typically require pieces of network equipment to be connected by media such as cable, fiber, or radio frequency signals. Relationship data may also include service links, for example, when a program on a personal computer (PC)—like MICROSOFT OUTLOOK—uses software on a server—like MICROSOFT EXCHANGE. In this example, the service link arises where the software program on the PC relies on functionality provided by the software program on the server.

Relationship data may also describe application dependency data, where applications that exist in a network environment may depend on other applications for service; service dependencies could include hardware or software. As a hardware example, several client users on a network may connect to a single server computer. Essentially, in order for the client's applications (e.g., MICROSOFT OUTLOOK) to be operable or accessible for those client users, the server computer hosting applications (e.g., MICROSOFT EXCHANGE) must be operable. As a software example, application programs executing independently of a server on a client computer could still rely on another application program hosted on that client computer to provide necessary functionality. For example, standalone programs such as WINDOWS EXPLORER and MICROSOFT OUTLOOK may rely on INTERNET EXPLORER, a web browser program, to provide HTML rendering and web browsing functionality in WINDOWS EXPLORER and MICROSOFT OUTLOOK.

Attribute data may include a technology type or an application type. For example, technology type may describe classes of network equipment in a network: all routers may be grouped in one technology type ("routers"), all servers may be grouped into another technology type ("servers"), etc. The technology types of "routers" and "servers" may in turn be grouped into another technology type: "network equipment." The number of technology types is potentially quite large and customizable to address particular network configurations.

Application type generally, describes particular application programs that operate on network equipment, including such programs as MICROSOFT EXCHANGE or MYSQL. Many applications in turn provide multiple functionalities. For example MICROSOFT OUTLOOK sends and receives email, schedules meetings, creates task lists, and tracks appointments. The system 100 contemplates that each of these functionalities may constitute its own application type potentially located in its own level in the hierarchical data structure 110, possibly in addition to an application type that identifies the particular application program providing these individual application type functionalities. The same abstraction can be extended another level down: for example, among applications and associated functionalities, individual commands can be organized hierarchically (e.g., SEND MESSAGE or RECEIVE MESSAGE).

In one embodiment, the partially-defined hierarchical data structure 110 is entered directly by a user or an automated system through input 150. In another embodiment, the input 150 communicates with a query processor 140 that, translates a request for information from input 150 into machine-readable code that the system 100 can recognize and process and in turn provides the partially-defined hierarchical data structure 110.

The processing engine 130 communicates with the partially-defined hierarchical data structure 110 and can add and remove elements from hierarchical data structure. Retrieving an element from an information source 120, the processing engine 130 considers the descriptive data associated with the element and add the element to the hierarchical data structure 110. The processing engine 130 generally reads or interprets the descriptive data associated with an element of an information source 120 and can identify the information source 120 based on the descriptive data associated with its constituent elements.

Figure 1B:
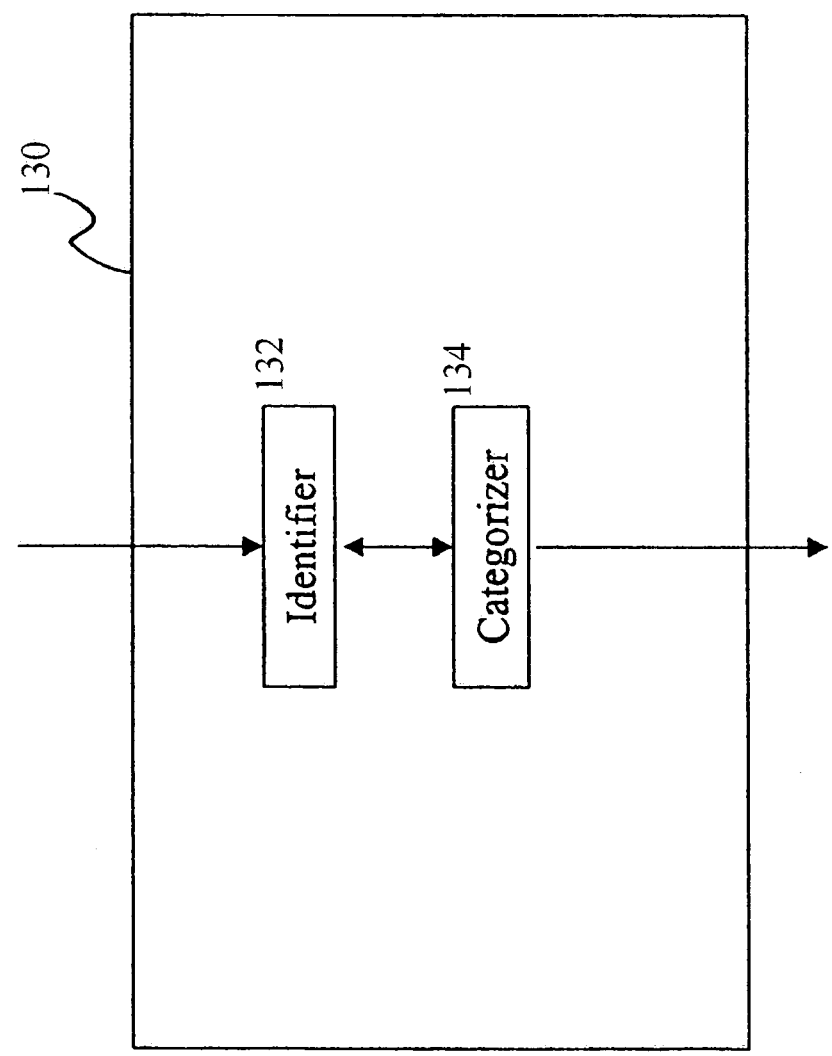
FIG. 1B depicts one embodiment of the processing engine of FIG. 1A.

As illustrated in FIG. 1B, in one embodiment the processing engine 130 includes an identifier 132 and a categorizer 134. When the processing engine communicates with an information source 120, the identifier 132 identifies the information source 120 and its elements by examining descriptive data associated with the elements. In this way, the identifier 132 is capable of identifying network sources, destinations, or applications. A network source, destination or application associated with an element defines where in the hierarchical data structure the element will be placed by the processing engine 130, if it all. After an element has been retrieved from the information source 120, the categorizer 134 determines whether the element belongs in the hierarchical data structure 110 based on the partial definition provided by the hierarchical data structure 110 and the descriptive data associated with the element. If the element is determined to belong in the hierarchical data structure 110, the categorizer 134 automatically adds it to one or more appropriate tiers in the structure 110.

Figure 2:
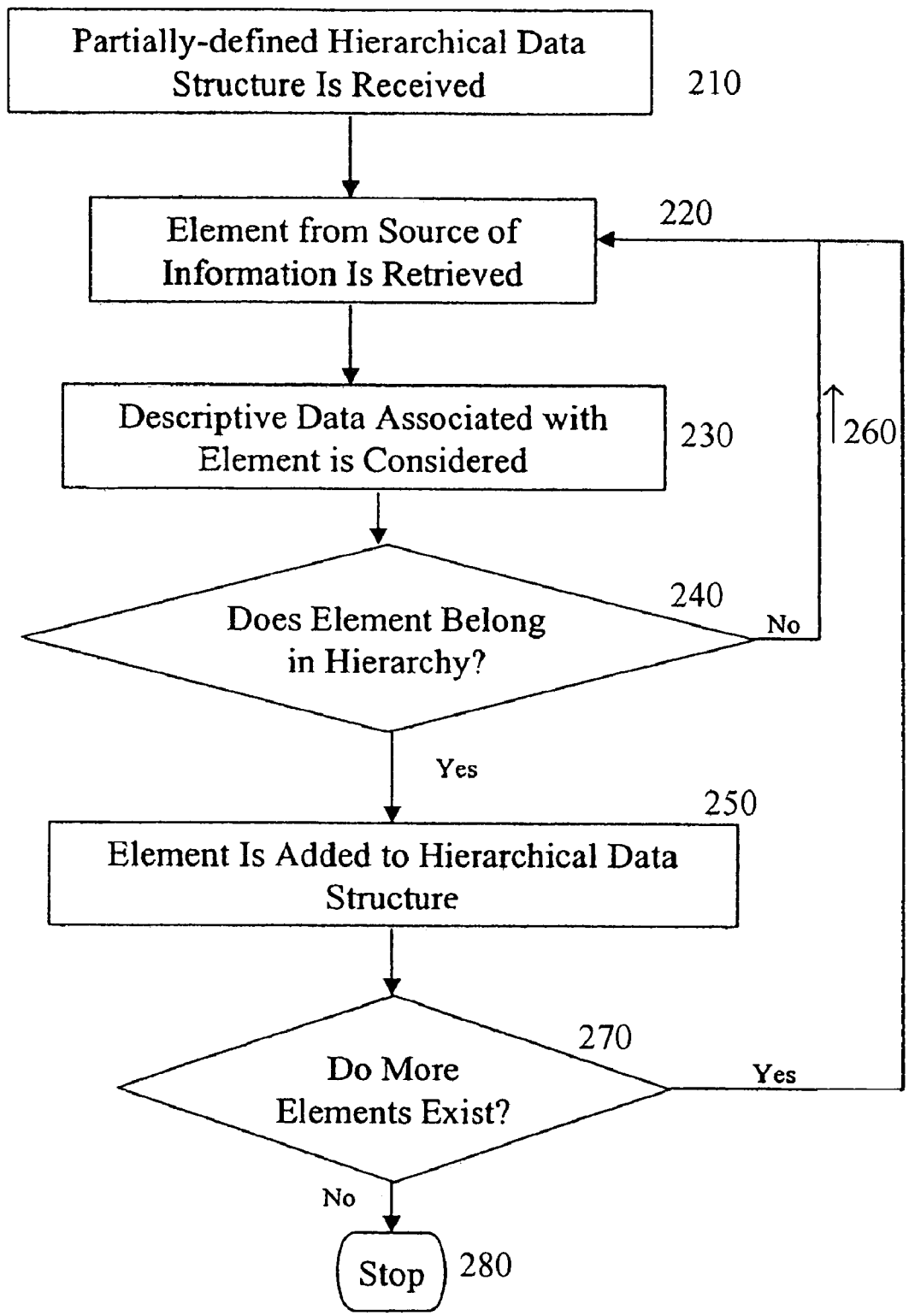
FIG. 2 presents a flowchart of a method for information processing according to an embodiment of the invention.

As depicted in FIG. 2, one embodiment of the invention also provides a method for automatically generating a hierarchical data structure. To automatically generate a hierarchical data structure according to the invention, a partially-defined hierarchical data structure is received 210. An element from an information source is retrieved 220, and descriptive data associated with that element is considered 230. If the element from the information source belongs in the hierarchical data structure 240, it is automatically added at one or more tiers in the hierarchical data structure 250. If a particular element does not belong in the hierarchical data structure, another element from the same or a different information source is retrieved 260, and the process iterates 270 until no more elements remain for consideration 280.

Figure 3:
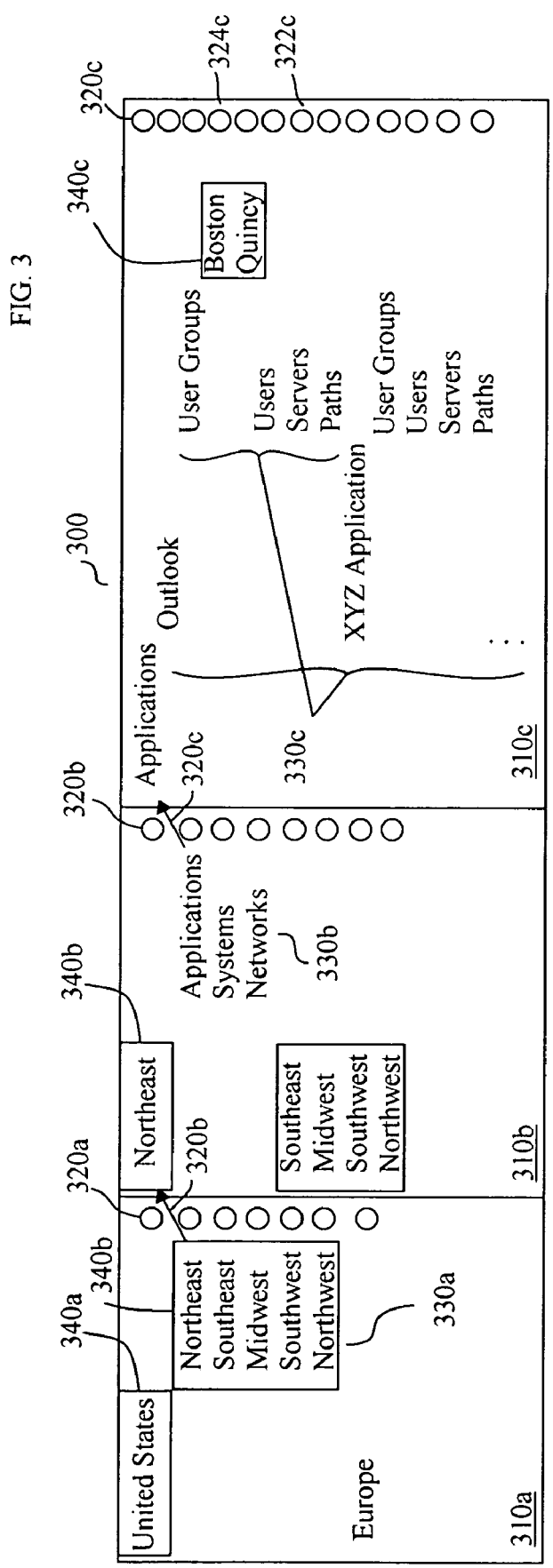
FIG. 3 depicts a hierarchical data structure in accord with an embodiment of the invention.

FIG. 3 depicts a hierarchical display of a hierarchical data structure generated according to an embodiment of the invention. In one embodiment of the present invention, the hierarchical data structure 110 is displayed substantially as it is generated on, e.g., display 160 and the display 160 receives substantially constant updates. The particular form of the displayed structure may, for example, take the form of graphical user interface ("GUI") 300. The GUI 300 depicts three levels of hierarchical information 310a, 310b, 310c. The highest level of hierarchical data is 310a and, as implied by the structure, the elements displayed in level 310b are a subset of the information displayed in 310a. Likewise, the elements displayed in level 310c are a subset of information displayed in level 310b.

As illustrate, the GUI 300 is also capable of displaying alarm states originating from particular network components associated with elements in the hierarchy. The alarm state 320a is displayed adjacent to an element in the display 300, alerting a viewer that the equipment associated with that element is alarmed and that the particular element may be selected to traverse the hierarchical display and potentially obtain more information about the source of the alarm. A second alarm state 320c is the output of a network monitor, alerting a viewer when network equipment is not operating or operating slowly; conversely, an appropriately colored alarm state indicator, e.g., a green light, may be used to indicate that the absence of alarm condition.

As discussed, alarm states may be presented at the level in the hierarchical display at which they originate, but in a deep or broad hierarchical structure, it may be useful to propagate alarm states and alarm state indicators up the hierarchy to facilitate analysis and review. For example, a problem with a piece of network equipment would cause an alarm state 322c to be triggered and displayed adjacent to the element related to the alarm, and in turn would also be displayed as an alarm state 320c at a higher level of hierarchy. Subsequently, alarm state 320c would trigger alarm state 320b, which in turn would trigger alarm state 320a.

If a user requested information about alarm 320a, for example, by selecting the displayed alarm state 320a with a mouse or touchpad, the request would partially define a hierarchical data structure that would result in automatically generated levels 310b and 310c. Another display in accord with the present invention would permit a hierarchical level 310a, 310b, or 310c to display sub-hierarchical information 330a, 330b, and 330c on the same display.

In the display 300, the text enclosed by boxes 340a, 340b, 340c within the hierarchical levels 310a, 310b, 310c represent the partially-defined hierarchical data structure of the present invention, based on, for example, geographic location of network elements. The partial definition of the hierarchical data structure may be provided manually, through automatic discovery, or by import from other sources like network management or mapping software. In one embodiment of the present invention, a display of an automatically generated hierarchical data structure also includes the number of users affected by certain network events or an estimate of cost associated with the number of users affected by certain network events.

The system also includes a filter to control or limit the alarm states relating to the hierarchical data structure that are displayed in the graphical display 300. In one implementation, the categorizer does not automatically add elements to the hierarchical data structure that satisfy one or more criteria specified by the filter. For example, a filter may exclude those elements based on alarm conditions relating to availability, responsiveness, failure status, delay in operation, or any combination thereof. In this manner, the display 300 would display only elements in the hierarchical data structure that did not meet the filter's criteria and would suppress the display of elements satisfying the filter's conditions. In another embodiment, the elements are added to the hierarchical data structure regardless of the conditions specified by the filter, and the filter selectively controls the displays of various alarm states associated with the elements of the hierarchical data structure, either before or after the insertion of the elements.

Impact Count Determination

The hierarchical display system of the present invention usefully assimilates and processes data from network equipment to enable a user to easily identify the presence of a problem in a computer network. Another aspect of the present invention provides information concerning the number of users affected by a problem detected within the system being monitored. For example, when the invention reports that some application service is 'too slow,' it is useful to know how many users of that service are affected. This number is referred to herein as the "impact count."

Embodiments of the present invention can compute the impact count from alarms and configuration information tied to response time measurement. An individual response time measurement is defined on an element called a response path. A response measurement can result from observing user activity, or by actively testing a service. In either case, the system associates a response path with two other elements. First, it associates a response path with the response destination, an element that represents the application service that is being used. Second, it associates the response path with a response source. In the case where a response path measures response time with active tests, the response source represents the tester. In the case where the response time derives from user activity, the response source represents the user of the service.

Each response source typically has an attribute that identifies the type of activity measured. This "application type" identifies the kind of test being performed in the case of active test measurements or the kind of user activity seen in the case of observed response measurements. These application types can be conceptually organized and grouped into an abstract directed graph, such as a hierarchical tree, representing the idea that response measurements can be interrelated. For example, in the active case a system may run multiple tests on the same application service that test different functions of the service. In the case where user activity defines the response measurement, the system may observe different user activities provided by the same service, or some combination of both techniques may be used. By grouping these different types of response measurements under the same higher-level application type, the system can determine a relationship among these related measurements.

When the observation of user activity is used to define response measurement, individual response path measurements sometimes fail to provide a good basis for detecting response time problems, for example, when individual users infrequently use a service. One solution to this problem is to group users in geographic and organizational proximity into "client sets" of observed response sources defined in the configuration of the system. Using these client sets, it is possible to derive "path sets," i.e., collections of related response paths. A path set may be defined for a client set, an application type, and a response destination so as to include all response paths whose response source is a member of the client set, whose application type matches the specified application time, and whose response destination matches the specified response destination. Since these response path sets combine measurements from multiple users, a more representative data sample is obtained and is less likely to result in false alarms.

An impact count for a group of related response destinations, response paths, etc., is computed beginning with a given "object" in the hierarchical display. As discussed above, the object represents a collection of one or more response elements and may be further limited to an application type.

For each element in the collection a set of users, i.e. observed response sources, is determined. When the element is an observed response source, the set of users is the observed response source. When the element is a client set, the set of users is the members of the client set. When the element is a response path, the set of users is the single response source associated with the response path. When the element is a response path set, the set of users is the members of the associated client set. Lastly, when the element is a response destination, the set of users is any and all observed response sources that are associated with a response path that is associated with the response destination. If an application type limits the object, then only response paths and path sets with that application type are considered.

The combined set of all unique observed response sources is the "user population" associated with that object, and the "population count" is the number of unique observed response sources in the user population set.

The impact count for an object is computed using the alarms on the response paths and path sets affecting the object. That is, if a response path is included in the collection, and the response path has an alarm, then the associated response source is included in the impacted set. Similarly, if a response path set has an alarm, then all the observed response sources in the client set are in the impacted set. The impact count becomes the number of unique users in the impacted set and can be displayed in the hierarchical display.

Figure 4:
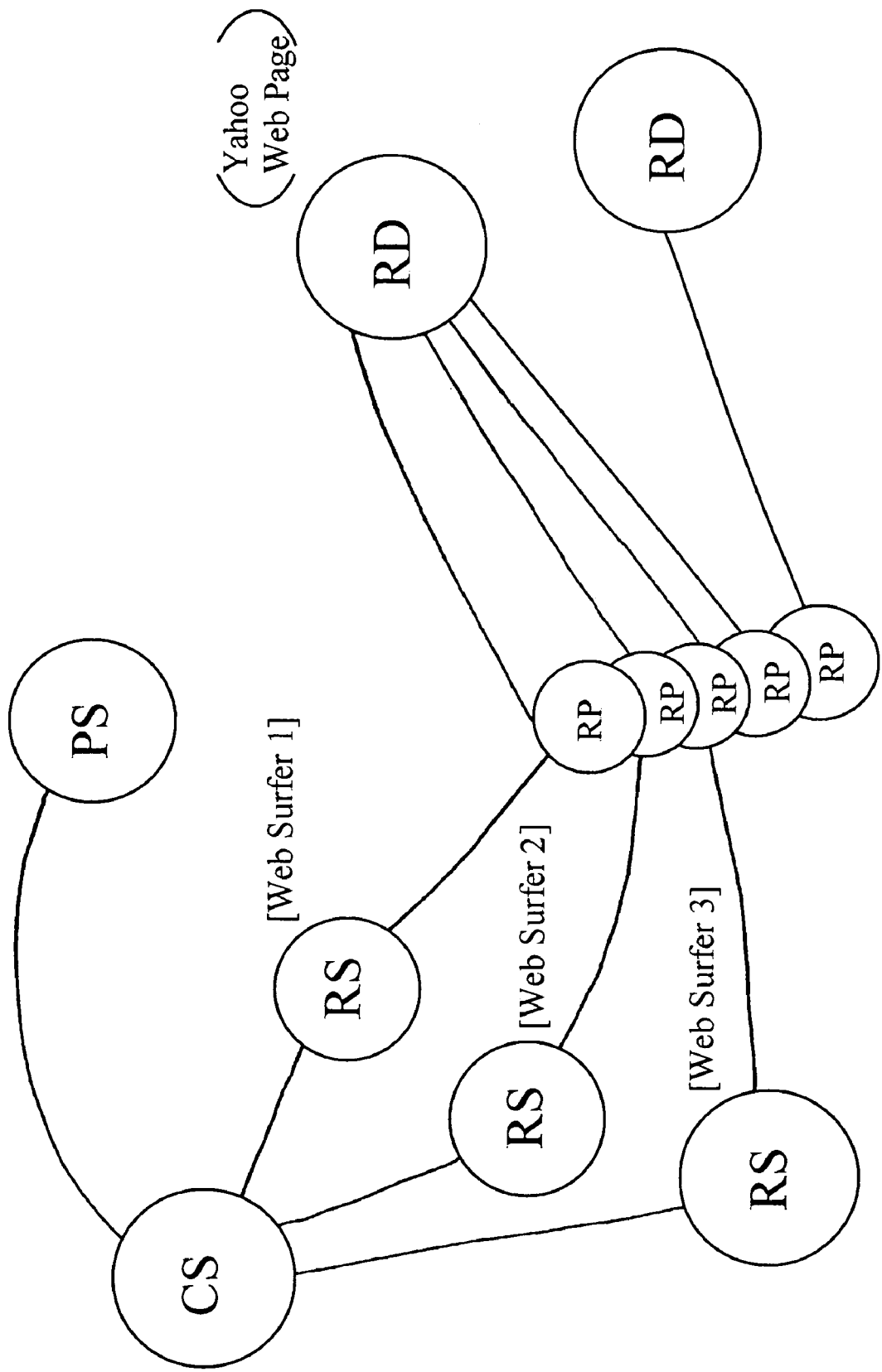
FIG. 4 illustrates an example computation of impact count in accord with an embodiment of the invention.

FIG. 4 illustrates one example of an impact count calculation. The RP elements represent response path measurements, i.e., the response time of a particular transaction through a particular path. Each RP element represents a response time measurement. The RD elements represent response destinations, and the RS elements represent response sources.

FIG. 4 presents three response paths where three different users (users 1, 2 and 3) access a YAHOO! web page. Each user has defined a response time threshold value that describes their individual maximum tolerable response time. For this example, assume that the actual response time to obtain the request web page exceeded the threshold values of users 1 and 2, but not user 3. Because of the exceeded threshold values, the response paths for users 1 and 2 would be associated with an alarm state, but the response path for user 3 would not. As discussed above, the "impact count" here would convey that two out of three users of YAHOO!'s server are being impacted by a potential server problem manifested by slow response times.

The example also illustrates the use of multiple impact counts for specific groups: assume that users 2 and 3 belong to a special group of "administrative staff," then the impact count for that particular group would be one out of two users of the "administrative staff" group. In some embodiments, different groups may aggregate different client sets and different path sets with different thresholds, so that different groups may not have the same perception of a network component's performance.

Figure 5:
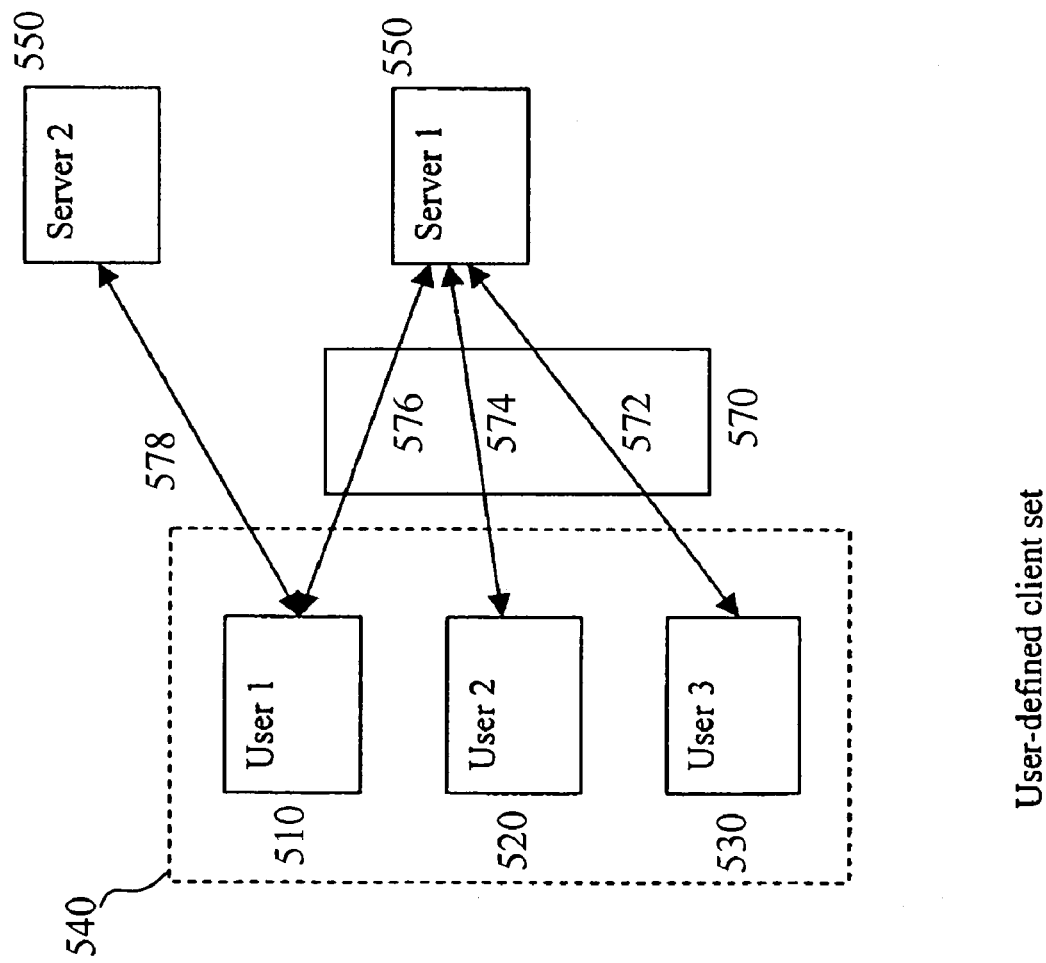
FIG. 5 illustrates another example computation of impact count in accord with an embodiment of the invention.

FIG. 5 presents another schematic illustrating the computation of impact count in accord with an embodiment of the invention. User1 510, User2 520, and User3 530 represent network users that have been grouped together as a client set 540. Server1 550 and Server2 560 represent pieces of network equipment, and each may be a response source and a response destination. Each user is connected to Server1 550 along a response path. Only User1 510 is connected to Server2 560. The response paths connecting User1 510, User2 520, and User3 530 to Server1 550 form a path set containing three response paths. The path connecting User1 510 to Server2 560 forms another path set containing one response path.

As discussed above, a tolerance time is associated with each user. For example, when User1 510 sends a query to Server1 550, Server1 550 responds, and the amount of time for the response to return to User1 510 is compared to the tolerance time associated with each network user in the client set. When the response time exceeds the tolerance time for a network user, that user is defined as impacted, and when a response time does not exceed the tolerance time for a network user, that user is defined as not impacted.

For network users of a client set with different tolerance times, a response may define some users as impacted and other users as not impacted. For example, assume that User1 510, User2 520, and User3 530 had tolerance times of 15, 10, and 5 seconds, respectively, and Server1 550 responded to a communication from User1 510 in 11 seconds. In such a case, User2 520 and User3 530 would be defined as impacted even though neither attempted to communicate with Server1 550, and User1 510 would be defined as not impacted. The definition of impact may also be associated with the setting of an alarm, state, which can be displayed in the aforementioned hierarchical display.

Ticker-Format Display

The hierarchical display system described above can be used to provide status information in an accessible format that conveys substantial amounts of information. A multilevel display hierarchy, however, can require a significant amount of space on a computer screen to display all of the tiers in the hierarchy.

The present invention also provides an improved display for the hierarchical data structure described above that is smaller than the multilevel display hierarchy. One embodiment of this display takes components from one level of the hierarchical data structure and horizontally scrolls them across a computer desktop from left to right in a narrow band. The width of the band can be approximately 10 percent of the vertical dimension of the desktop, although narrower and wider bands may be used depending upon the desktop space the user allocates to the display. In one embodiment, the ticker is a computer program written in JavaScript or ActiveX language, and may be provided over a network.

Figure 6A:
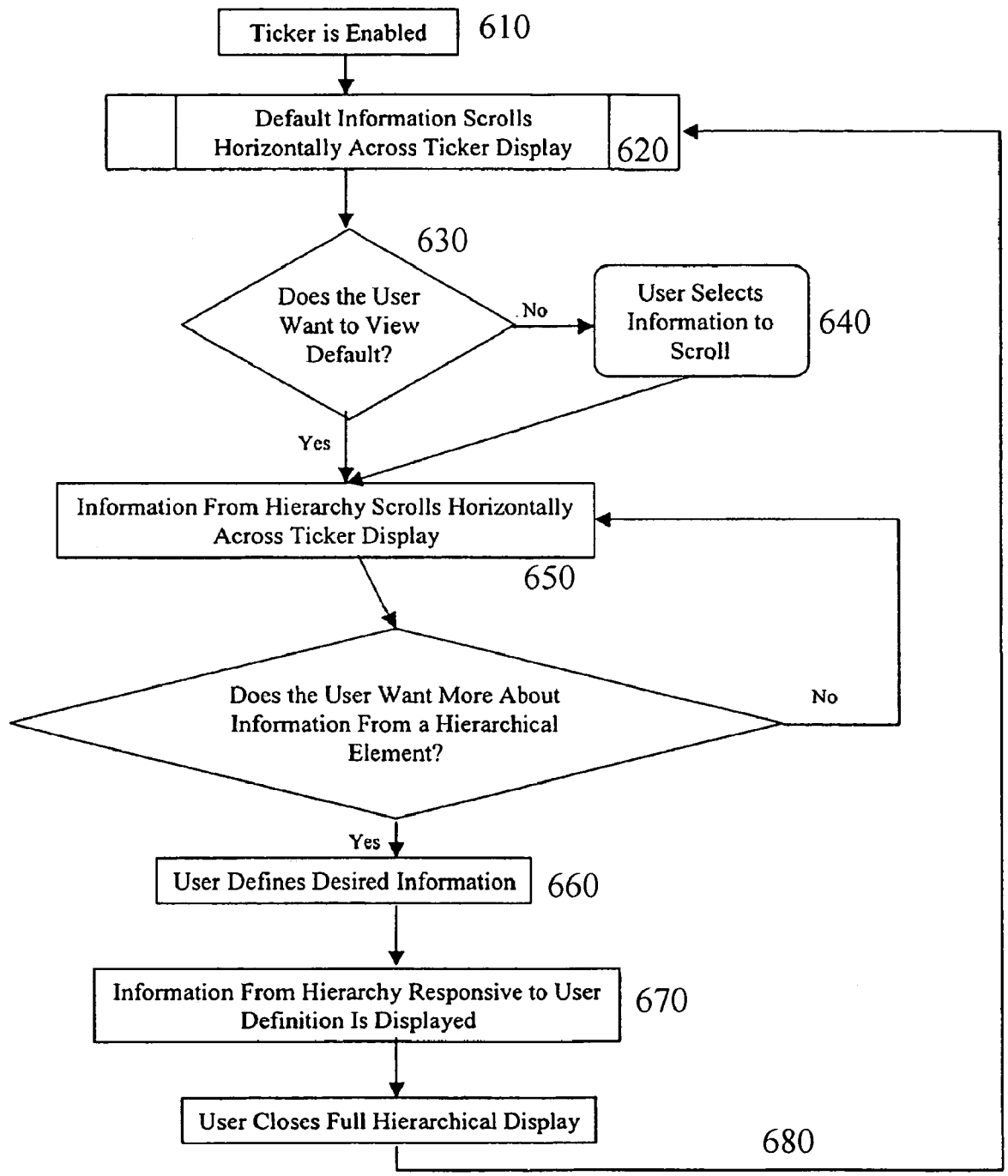
FIG. 6A is a flowchart of a method for displaying a hierarchical data structure according to an embodiment of the invention.

In one embodiment, referring to FIG. 6A, a ticker is first enabled 610, and appears on the display. Component information from one level of the hierarchical data structure is scrolled horizontally across the window displaying the ticker 620. A user may then observe that tier of information as it scrolls across the window 630. A user desiring to view information from another tier of the hierarchical data structure selects that tier of the hierarchical data structure 640 and, in turn, information from the newly-selected tier scrolls across the ticker 650. In general, the status ticker display serially scrolls all hierarchical tier components within the selected subset of components, regardless of whether the status associated with the component is good or bad.

All of the components from the selected level of the hierarchical data structure may be displayed serially from highest tier in the hierarchy to lower tier in the hierarchy. Alternately, the hierarchical tiers may be selectively displayed such that only certain pre-selected tier components are displayed in scrolling ticker format, or only a fixed subset of all hierarchy tiers is displayed in the scrolling ticker format.

In another embodiment, the ticker display contains a selectable link to the hierarchical data structure. In response to a user selecting the link 660, the ticker displays detailed information about the element associated with the selected link drawn from the hierarchical data structure 670. In still another embodiment, in response to the selection of a link, the ticker display reverts to the display of the entire hierarchical data structure. When the user closes the display of the full hierarchical data structure or the detailed display of a particular selected element, the ticker display can revert to its initial form, scrolling through one or more tiers of the hierarchical data structure 680.

Figure 6B:
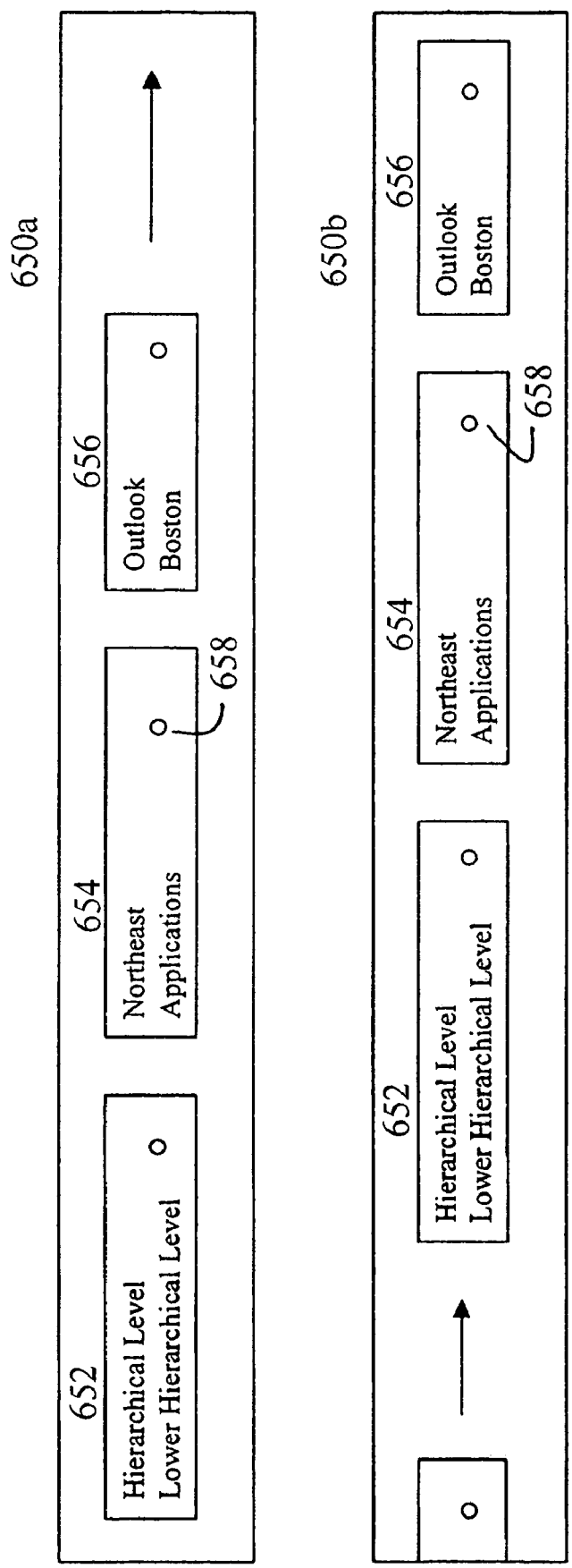
FIG. 6B depicts a ticker display of a hierarchical data structure according to an embodiment of the invention.

FIG. 6B depicts a display of a ticker at two points in time according to an embodiment of the invention. Display 650a occurred at some point in time before display 650b. This ticker generally displays elements of information from adjacent hierarchical levels—this provides context to the information. For example, the ticker pane 654 of "Northeast/Applications" represents a sub-hierarchy of a second level of information elements 310b from FIG. 3. Likewise, the pane 656 of "Outlook/Boston" represents a sub-hierarchy of a third level of information elements 310b from FIG. 3. According to an embodiment of the invention, a user could select the pane 656 for "Outlook/Boston," and the third level of information elements 310c from FIG. 3 would appear. Optionally, the entire hierarchical data structure display 300 from FIG. 3 could appear. The ticker also displays alarm states 658.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. The following claims are thus to be read as not only literally including what is set forth by the claims but also to include all equivalents that are insubstantially different, even though not identical in other respects to what is shown and described in the above illustrations.

What is claimed is:

1. A method for determining a number of network users affected by a network problem comprising:
   for each response source among a plurality of response sources:
      determining a response time for the response source connecting to a first response destination via a response path,
      determining whether an alarm state exists along the response path based on the determined response time, and
      if the alarm state exists, adding the response source to an impacted set;
   determining a unique number of response sources in the impacted set; and
   determining the number of network users affected by a network problem based on the determined unique number.

2. The method of claim 1, wherein each response source among the plurality of response sources are associated with a threshold value for triggering the alarm state for their respective response paths.

3. The method of claim 2, wherein the threshold value is set by each response source among the plurality of response sources, wherein at least two response sources among the plurality of response sources have different threshold values.

4. The method of claim 1, wherein determining a response time for each of a plurality of response sources is based on an application type, associated with each respective response path, that identifies a method for determining the response time.

5. The method of claim 4, wherein the method for determining the response time is actively testing the response time for each respective response path.

6. The method of claim 4, wherein the method for determining the response time is passively observing usage activities by each response source among the plurality of response sources connecting to the first response destination.

7. The method of claim 4, further comprising grouping the response paths by their respective application types, wherein the number of affected users is determined based on the grouping.

8. A system for determining a number of network users affected by a network problem comprising:
one or more processors configured to:
for each response source among a plurality of response sources:
determine a response time for the response source connecting to a first response destination via a response path,
determine whether an alarm state exists along the response path based on the determined response time, and
if the alarm state exists, add the response source to an impacted set;
determine a unique number of response sources in the impacted set; and
determine the number of network users affected by a network problem based on the determined unique number.

9. The system of claim 8, wherein each response source among the plurality of response sources are associated with a threshold value for triggering the alarm state for their respective response paths.

10. The system of claim 9, wherein the threshold value is set by each response source among the plurality of response sources, wherein at least two response sources among the plurality of response sources have different threshold values.

11. The system of claim 8, wherein determining a response time for each of a plurality of response sources is based on an application type, associated with each respective response path, that identifies a method for determining the response time.

12. The system of claim 11, wherein the method for determining the response time is actively testing the response time for each respective response path.

13. The system of claim 11, wherein the method for determining the response time is passively observing usage activities by each response source among the plurality of response sources connecting to the first response destination.

14. The system of claim 11, the one or more processors further configured to:
group the response paths by their respective application types, wherein the number of affected users is determined based on the grouping.

15. A non-transitory computer readable medium having computer executable instructions thereon for determining a number of network users affected by a network problem, the instructions when executed on one or more processors configuring the one or more processors to:
for each response source among a plurality of response sources:
determine a response time for the response source connecting to a first response destination via a response path,
determine whether an alarm state exists along the response path based on the determined response time, and
if the alarm state exists, add the response source to an impacted set;
determine a unique number of response sources in the impacted set; and
determine the number of network users affected by a network problem based on the determined unique number.

16. The non-transitory computer readable medium of claim 15, wherein each response source among the plurality of response sources are associated with a threshold value for triggering the alarm state for their respective response paths.

17. The non-transitory computer readable medium of claim 16, wherein the threshold value is set by each response source among the plurality of response sources, wherein at least two response sources among the plurality of response sources have different threshold values.

18. The non-transitory computer readable medium of claim 15, wherein determining a response time for each of a plurality of response sources is based on an application type, associated with each respective response path, that identifies a method for determining the response time.

19. The non-transitory computer readable medium of claim 18, wherein the method for determining the response time is actively testing the response time for each respective response path.

20. The non-transitory computer readable medium of claim 18, wherein the method for determining the response time is passively observing usage activities by each response source among the plurality of response sources connecting to the first response destination.

21. The non-transitory computer readable medium of claim 18, the instructions when executed further configuring the one or more processors to:
group the response paths by their respective application types, wherein the number of affected users is determined based on the grouping.

* * * * *